United States Patent
Tsai

(10) Patent No.: US 8,061,487 B2
(45) Date of Patent: Nov. 22, 2011

(54) MECHANISM FOR QUICKLY LOOSENING AND TIGHTENING BRAKE CABLE IN CALIPER BRAKE OF BICYCLE

(76) Inventor: Szu-Fang Tsai, Changhua (TW)

( * ) Notice: Subject to any disclaimer, the term of this patent is extended or adjusted under 35 U.S.C. 154(b) by 393 days.

(21) Appl. No.: 12/409,283

(22) Filed: Mar. 23, 2009

(65) Prior Publication Data

US 2010/0236874 A1  Sep. 23, 2010

(51) Int. Cl.
*B62L 1/02* (2006.01)
*B62L 3/00* (2006.01)
(52) U.S. Cl. .......... 188/24.12; 188/2 D; 188/24.22
(58) Field of Classification Search ......... 188/24.12, 188/24.13, 24.22, 2 D
See application file for complete search history.

(56) References Cited

U.S. PATENT DOCUMENTS

| | | | | |
|---|---|---|---|---|
| 3,941,215 A * | 3/1976 | Schoch | | 188/24.19 |
| 4,009,768 A * | 3/1977 | Fujii | | 188/24.22 |
| 4,591,026 A * | 5/1986 | Nagano | | 188/2 D |
| 4,718,521 A * | 1/1988 | Hosokawa | | 188/24.19 |
| 4,823,917 A * | 4/1989 | Kenny | | 188/24.19 |
| 6,298,951 B1 * | 10/2001 | Wu | | 188/24.12 |
| 6,945,368 B2 * | 9/2005 | Peyre | | 188/24.22 |

* cited by examiner

*Primary Examiner* — David Dunn
*Assistant Examiner* — Philip Gabler

(57) ABSTRACT

A bicycle caliper brake includes a cable housing at an upper end of a first arm; a pivotal second arm comprising a coupling member at one end and a stepped groove on a bottom edge of the coupling member; a brake cable loosening and tightening device comprising a first unit, a second unit for pivotably securing the device to the coupling member, and a hole; a cable fastener secured to the first unit; a brake cable passing the cable housing to be fastened at the cable fastener; and a spring depressible trigger pin comprising a C-ring at one end, the trigger pin being driven through the groove and the hole to releasably secure the C-ring to the hole. Pressing the trigger pin will unfasten the C-ring and pivoting the device about the second unit will loosen the brake cable and increase a distance between brake pads at arms' ends.

4 Claims, 6 Drawing Sheets

MECHANISM FOR QUICKLY LOOSENING AND TIGHTENING BRAKE CABLE IN CALIPER BRAKE OF BICYCLE

BACKGROUND OF THE INVENTION

1. Field of Invention

The invention relates to bicycle brake systems and more particularly to a mechanism for quickly loosening and tightening a brake cable in a caliper brake of bicycle with improved characteristics.

2. Description of Related Art

It is a laborious job for an ordinary person to quickly loosen a brake cable in a caliper brake of bicycle if the person wants to repair or replace a broken tire. Using tools does not help a lot.

Therefore, a variety of mechanisms for quickly loosening and tightening a brake cable in a caliper brake of bicycle are commercially available. However, so far as the inventor is aware, the well known mechanisms equipped with the caliper brakes have had no market acceptance. This is because such prior mechanisms are typically relatively complex in constructions, costly to manufacture, trouble-prone, and unreliable in use. Thus, the need for improvement still exists.

SUMMARY OF THE INVENTION

It is therefore one object of the invention to provide a mechanism for quickly loosening and tightening a brake cable in a caliper brake of a bicycle.

The above and other objects, features and advantages of the invention will become apparent from the following detailed description taken with the accompanying drawings.

DETAILED DESCRIPTION OF THE INVENTION

Figure 1:
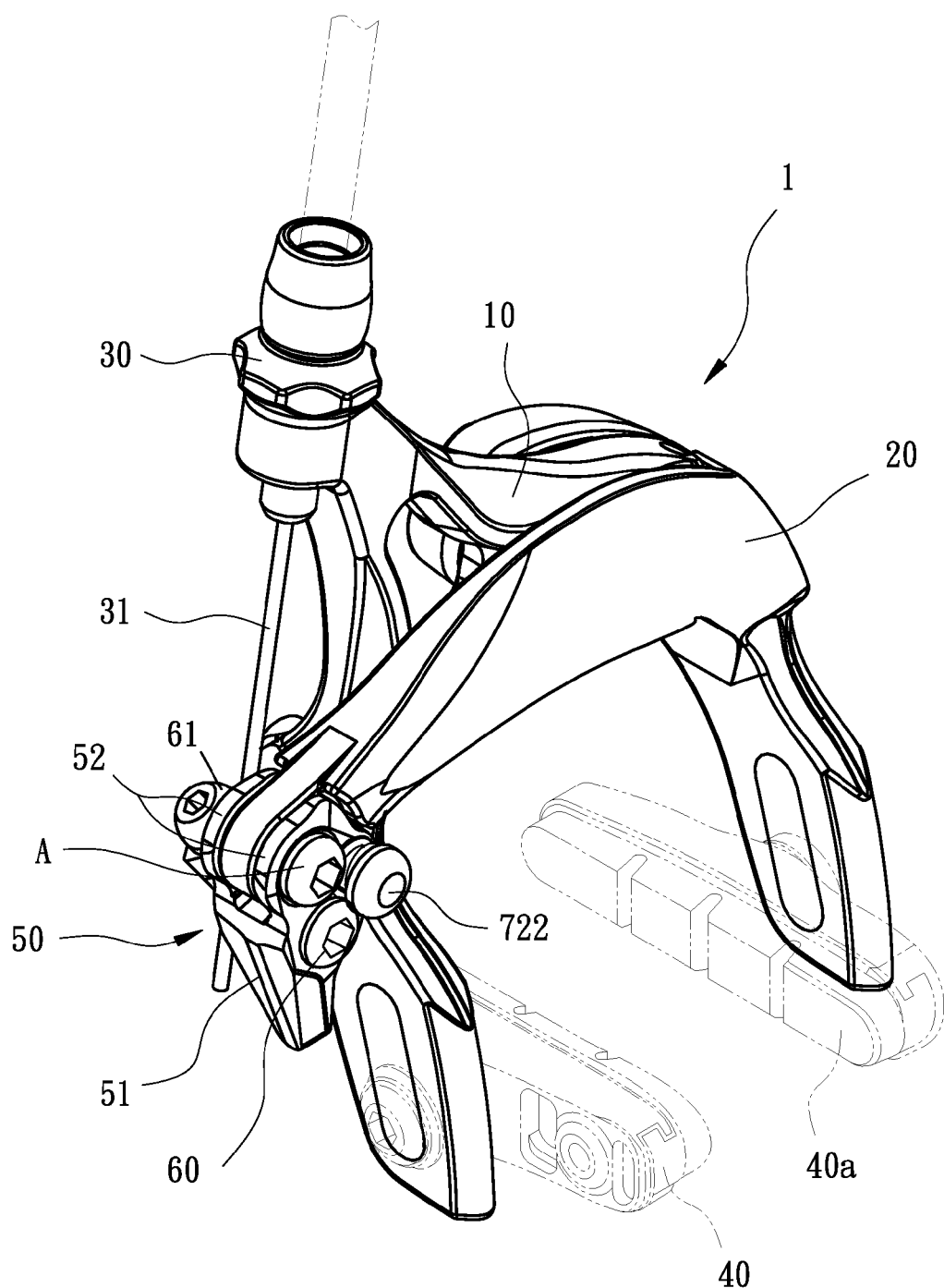
FIG. 1 is a perspective view of a caliper brake of bicycle incorporating a preferred embodiment of mechanism for quickly loosening and tightening a brake cable according to the invention with brake pads shown in phantom.
Figure 2:
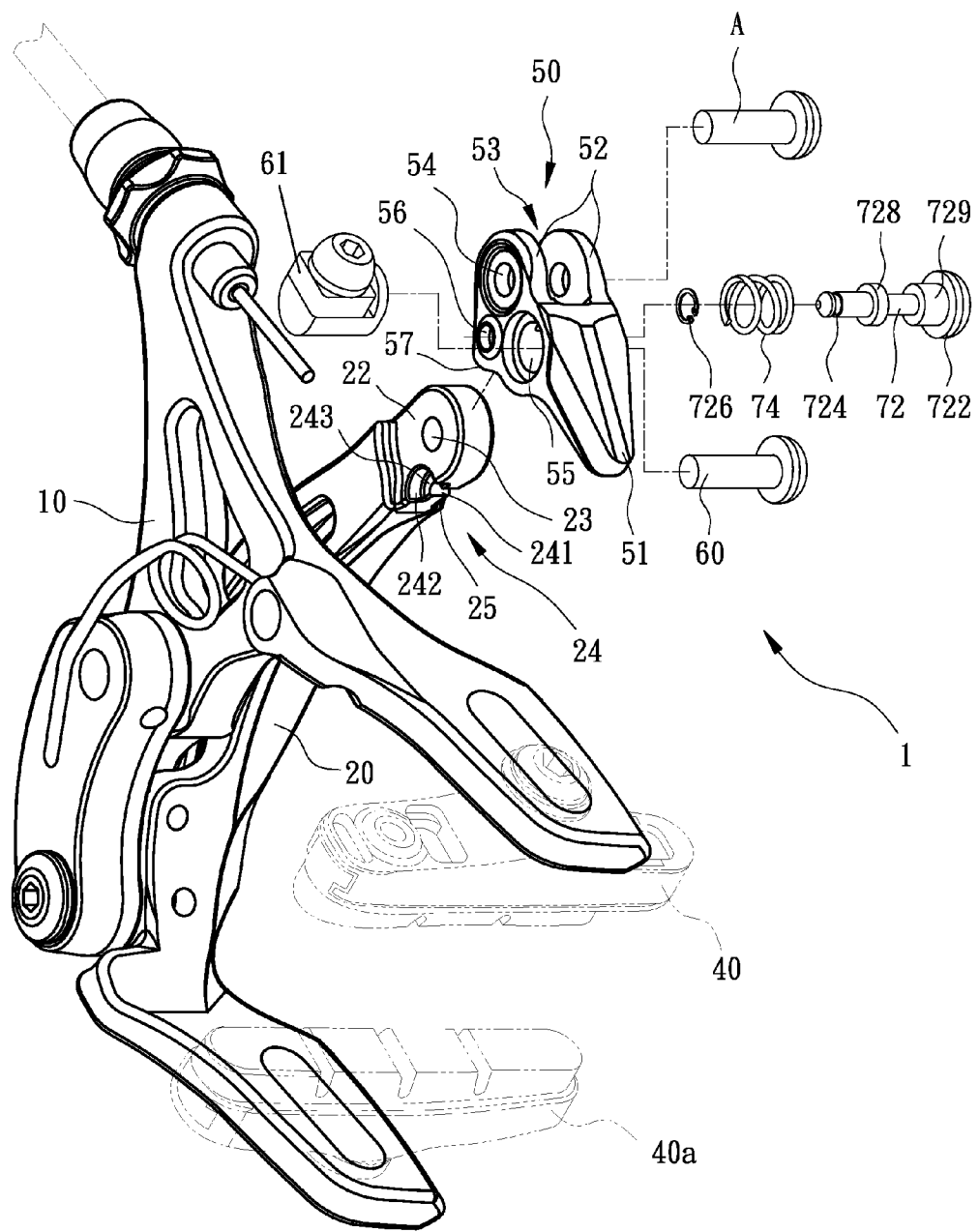
FIG. 2 is a perspective exploded view of FIG. 1.

Referring to FIGS. 1 to 6, a caliper brake 1 of bicycle incorporating a mechanism for quickly loosening and tightening a brake cable in accordance with the invention comprises the following components as discussed in detail below.

A caliper brake 1 is implemented as a single pivot side-pull caliper brake. The caliper brake 1 comprises a first arm 10 and a second arm 20. Both arms 10, 20 cross at a pivot. The first arm 10 has an upper end with a cable housing 30 provided thereat. A brake cable 31 passes the cable housing 30. A lower end of the first arm 10 is provided with a first brake pad 40. The second arm 20 has one end provided with a brake cable loosening and tightening device 50 and the other end provided with a second brake pad 40a.

One end of the second arm 20 is cut to form a coupling member 22 of decreased thickness, the coupling member 22 having a curved outer edge. A longitudinal hole 23 passes the coupling member 22. A stepped groove 24 is formed on a bottom edge of the coupling member 22. The groove 24 has a first portion 241 of small diameter at a front end, a second portion 242 of large diameter at a rear end, and a narrow channel 243 between the first and second portions 241, 242. A well 25 is provided on the bottom edge of the coupling member 22 adjacent the first portion 241 thereof.

The brake cable loosening and tightening device 50 comprises a lower flat 51 on an outer surface, an upper bifurcation with a gap 53 defined between its two arms 52, a first hole 54 through the arms 52 and adapted to align with the longitudinal hole 23, a second hole 55 below the first hole 54, and a third hole 56 adapted to align with the groove 24. A pivot pin A is driven through the first hole 54 and the longitudinal hole 23 to pivotably secure the brake cable loosening and tightening device 50 and the coupling member 22 (i.e., the second arm 20) together. A fastener 60 is driven through the second hole 55 to secure to a cable fastener 61 which is adapted to fasten the brake cable 31. A projection 57 is formed on the outer surface of the brake cable loosening and tightening device 50 adjacent the third hole 56 and is retained in the well 25 for positioning.

A trigger device comprises a stepped rod 72 comprising an enlarged head 722, a first diameter section 729 adjacent the head 722, a second diameter section 728 spaced from the first diameter section 729 to form an annular groove (not numbered) therebetween, the second diameter section 728 having a diameter the same as that of the first diameter section 729, and an annular recess 724 at one end; and a helical spring 74 put on the first diameter section 729. The rod 72 is driven through the groove 24 and the third hole 56 and then a fastening member (e.g. C-ring 726) is put on the recess 724 to securely urge against the mouth of the third hole 56. The rod 72 is thus implemented as a spring depressible member because the spring 74 is biased between the head 722 of the rod 72 and one end of the groove 24.

Figure 3:
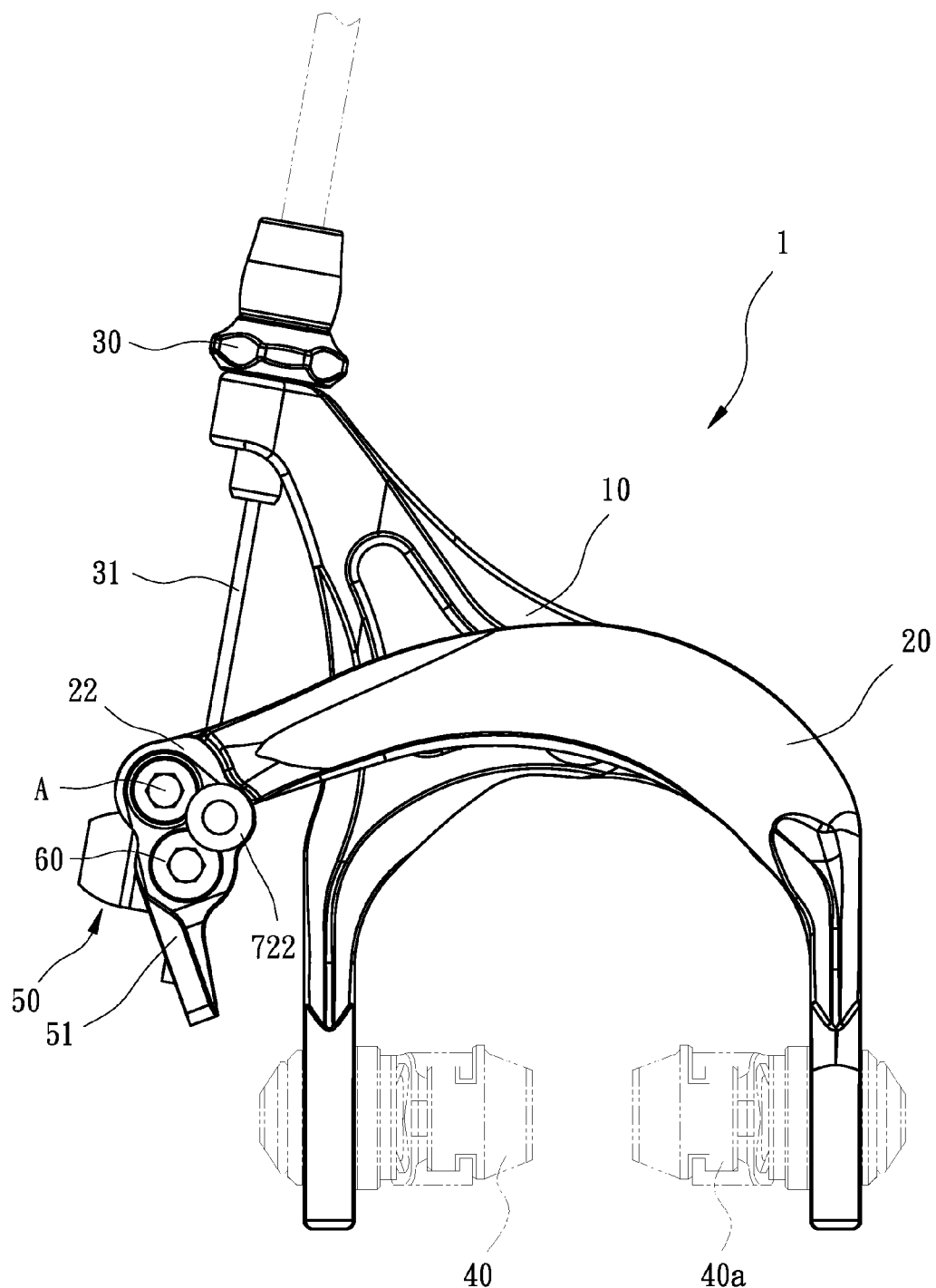
FIG. 3 is a front view of FIG. 1 where the brake cable is tightened.
Figure 5:
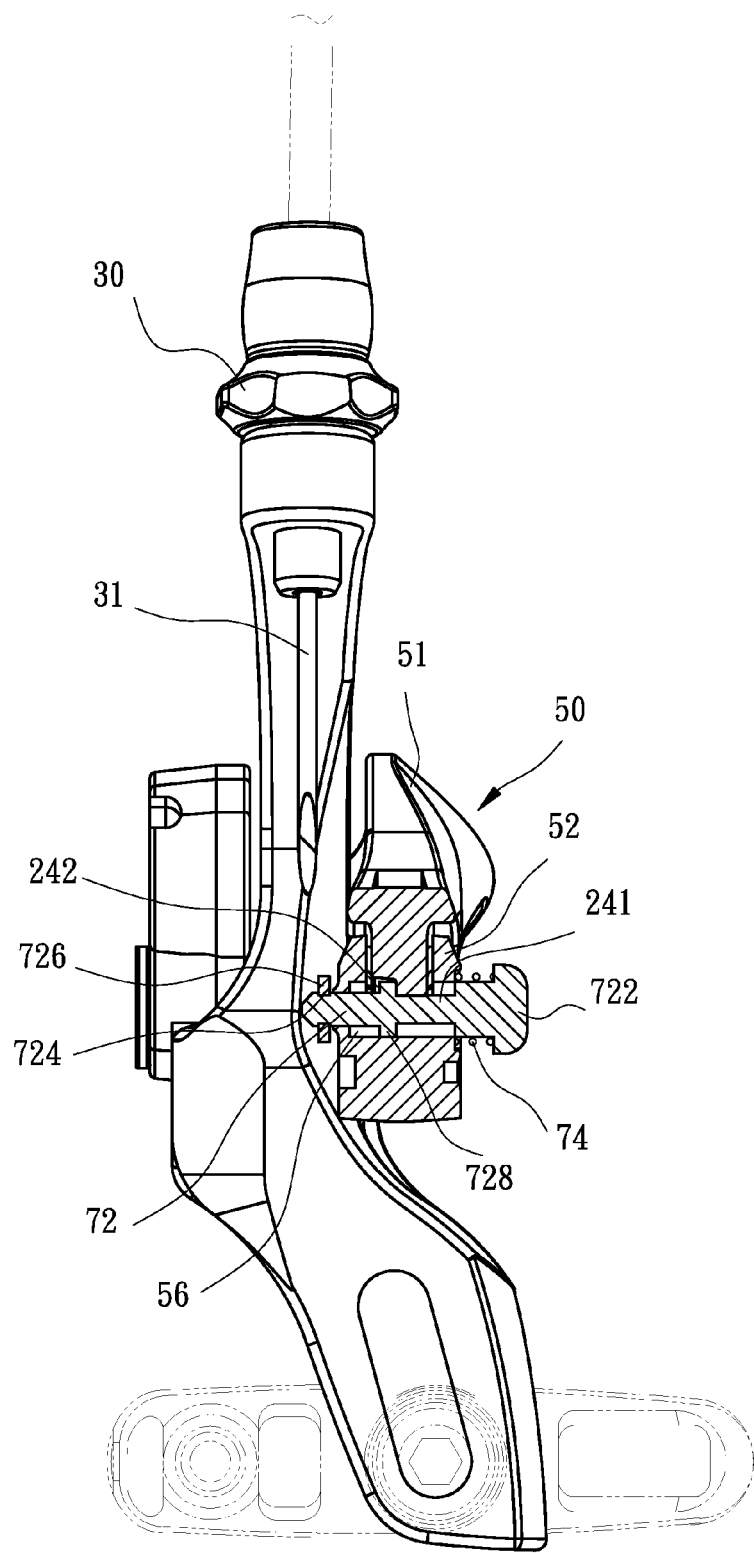
FIG. 5 is a side elevation in part section of FIG. 3 where the trigger device is not activated.

In an inoperative state as shown in FIGS. 3 and 5, the spring 74 expands to dispose the second diameter section 728 in the second portion 242 of the groove 24. Also, the C-ring 726 securely urges against the mouth of the third hole 56. As such, the brake cable loosening and tightening device 50 is fastened and the brake cable 31 is held tight.

Figure 4:
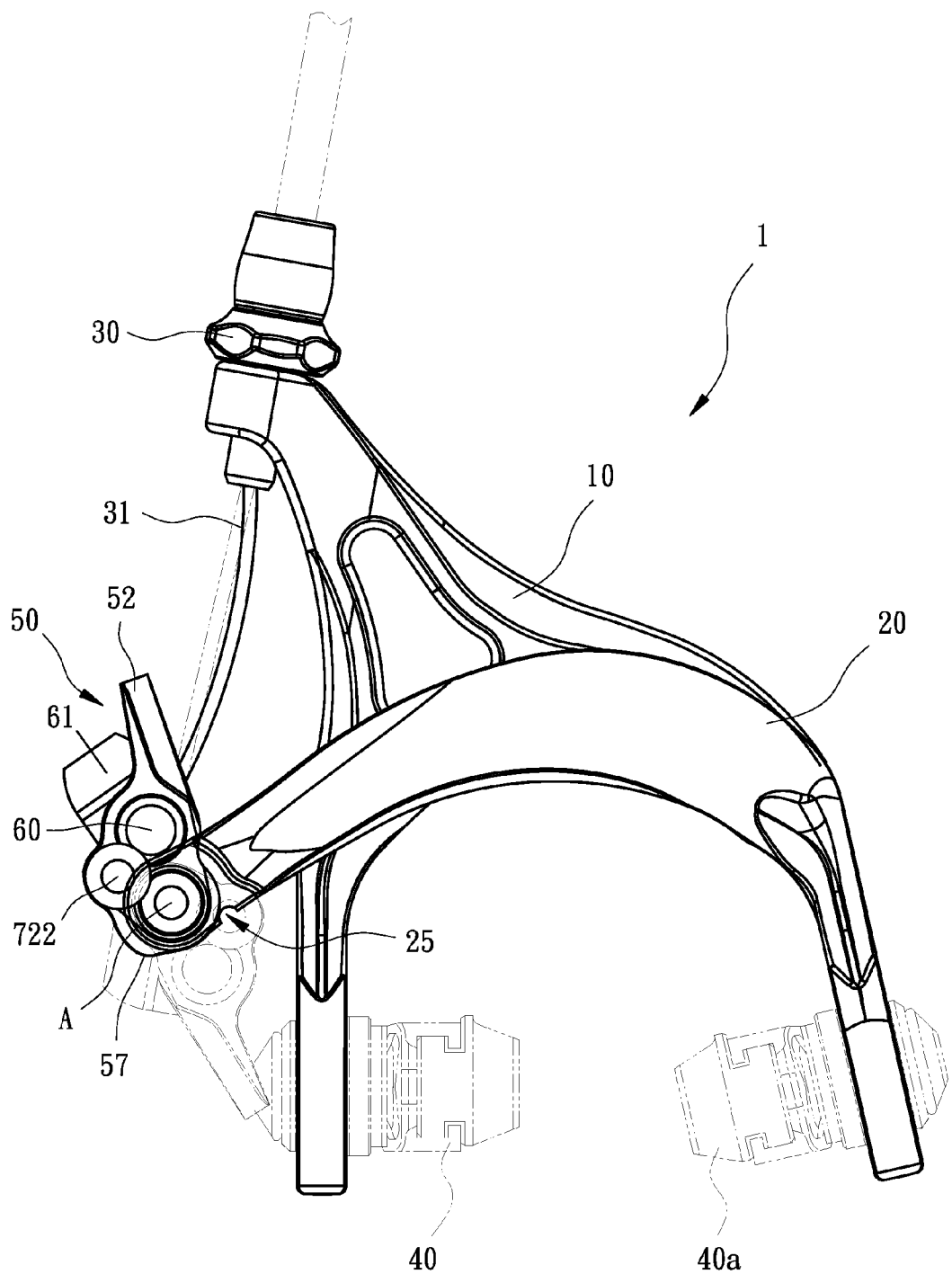
FIG. 4 is a view similar to FIG. 3 where the brake cable is loosened.
Figure 6:
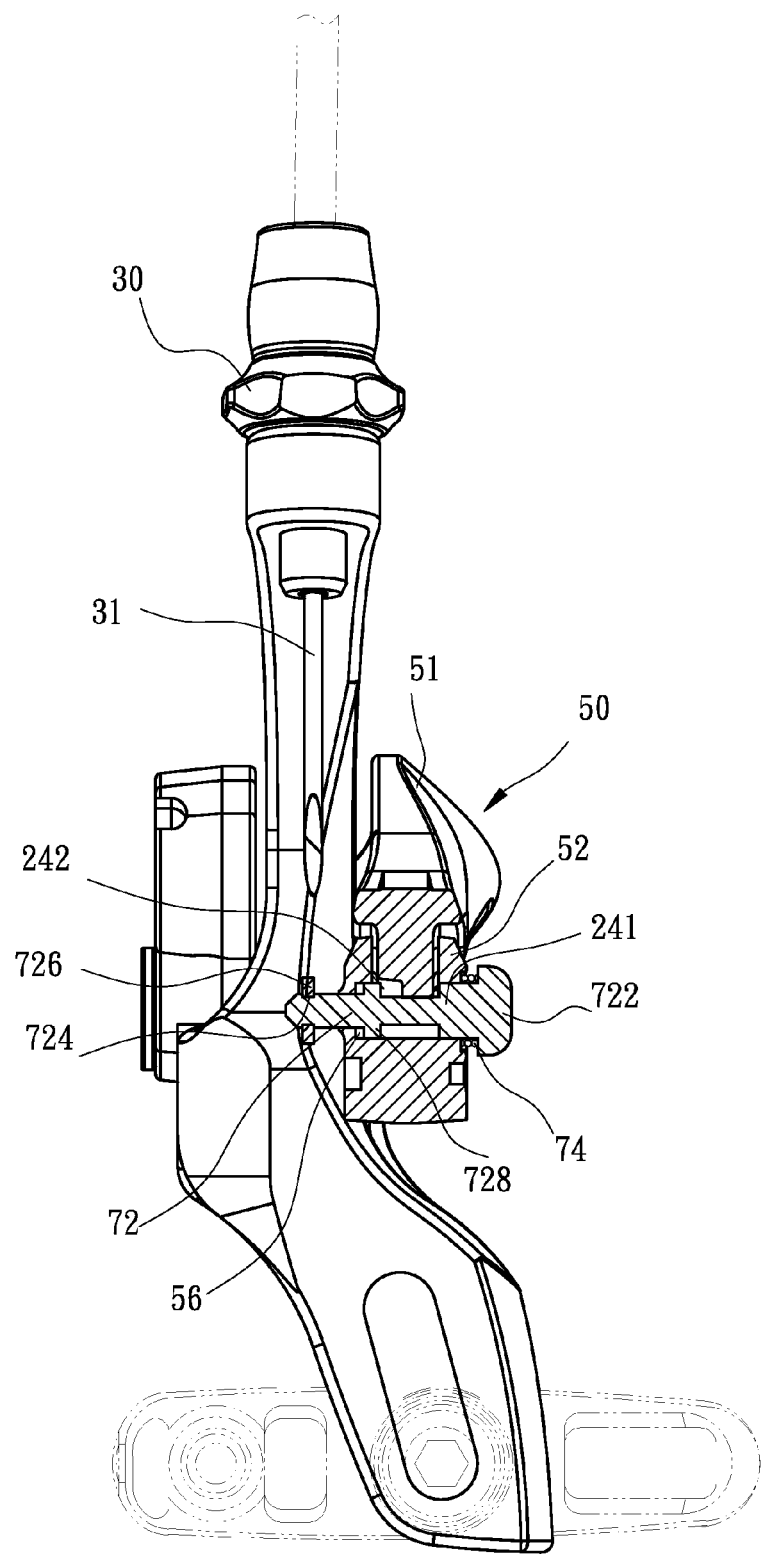
FIG. 6 is a view similar to FIG. 5 where the trigger device is activated.

As shown in FIGS. 4 and 6, for repairing or replacing a tire (not shown), a rider may press the head 722 to compress the spring 74 and push the rod 72 rearward. Hence, the C-ring 726 moves rearward to disengage from the third hole 56, i.e., the brake cable loosening and tightening device 50 is unfastened. Also, the second diameter section 728 moves from the second portion 242 of the groove 24 to the third hole 56. Next, the rider may clockwise pivot the brake cable loosening and tightening device 50 about the pivot pin A. Hence, the projection 57 clears the well 25. The brake cable 31 becomes loose after the pivotal operation of the brake cable loosening and tightening device 50. Also, a distance between the brake pads 40 and 40a is increased. This can facilitate the tire repair or replacement.

It is understood that after the tire repair or replacement, the rider may pivot the brake cable loosening and tightening device 50 downward (i.e., counterclockwise) from the position shown in FIG. 4 to that shown in FIG. 3. After releasing the rod 72, the projection 57 enters the well 25 again with the rod 72 slid forward until the second diameter section 728 moves into the second portion 242 of the groove 24 due to the expansion of the spring 74. Also, the C-ring 726 securely urges against the mouth of the third hole 56 and the projection 57 enters the well 25 again for positioning.

While the invention herein disclosed has been described by means of specific embodiments, numerous modifications and variations could be made thereto by those skilled in the art without departing from the scope and spirit of the invention set forth in the claims.

What is claimed is:

1. A caliper brake of a bicycle comprising:
a first arm;
a cable housing disposed at an upper end of the first arm;
a first brake pad affixed to a lower end of the first arm;
a second arm pivotably secured to the first arm and comprising a coupling member at one end and a stepped groove formed on a bottom edge of the coupling member;
a second brake pad affixed to the other end of the second arm;
a brake cable loosening and tightening device a lower flat on an outer surface, two arms extended from two sides of the lower flat respectively, an upper bifurcation with a gap defined between the two arms, a first hole passed through the arms and used to align with a longitudinal hole of the coupling member, a second hole located below the first hole, and a third hole disposed adjacent to the second hole and used to align with the groove, wherein a pivot pin is driven through the first hole and the longitudinal hole to pivotably secure the brake cable loosening and tightening device and the coupling member together, a fastener is driven through the second hole to secure to a cable fastener which is fastened the brake cable, and a projection is formed on the outer surface of the brake cable loosening and tightening device adjacent the third hole and is retained in a well of the groove for positioning;
a brake cable passing the cable housing to be fastened at the cable fastener; and
a trigger pin comprises a stepped rod comprising an enlarged head, a first diameter section adjacent the enlarged head, a second diameter section spaced from the first diameter section to form an annular groove therebetween and having a diameter the same as a diameter of the first diameter section and an annular recess at one end; and a helical spring put on the first diameter section, wherein the stepped rod is driven through the groove and the third hole and then a C-ring is put on the recess to securely urge against a mouth of the third hole, and the stepped rod is thus implemented as a spring depressible member because the spring is biased between the head of the stepped rod and one end of the groove;
wherein the head is pressed to compress the spring and the rod is pushed rearward to make the C-ring move rearward to disengage from the third hole and the brake cable loosening and tightening device be unfastened; the second diameter section moves from the groove to the third hole, and then the brake cable loosening and tightening device is capable of clockwise being pivoted about the pivot pin; and the brake cable becomes loose after the pivotal operation of the brake cable loosening and tightening device and a distance between the first and second brake pads is increased; and
wherein the brake cable loosening and tightening device is pivoted downward, after releasing the stepped rod, the projection enters the well again with the stepped rod slid forward until the second diameter section moves into the groove due to the expansion of the spring, and the C-ring securely urges against the mouth of the third hole and the projection enters the well again for positioning.

2. The caliper brake of claim 1, wherein the groove comprises a first portion at a front end, a second portion at a rear end, the second portion having a diameter larger than that of the first portion, and a channel communicating the first portion with the second portion; and wherein the second diameter section is either in the second portion when the trigger pin is not pressed or in the hole when the trigger pin is pressed to disengage the C-ring from the hole.

3. The caliper brake of claim 2, wherein the well is formed adjacent the first portion, and wherein the brake cable loosening and tightening device further comprises a projection formed on its outer surface, the projection being disposed in the well for positioning when the trigger pin is not pressed.

4. The caliper brake of claim 1, wherein the coupling member is recessed.

* * * * *